(12) United States Patent
Kristen et al.

(10) Patent No.: US 6,271,329 B1
(45) Date of Patent: Aug. 7, 2001

(54) ETHYLENE COPOLYMERS HAVING A NARROW DISTRIBUTION OF COMONOMERS

(75) Inventors: Marc Oliver Kristen; Dieter Lilge, both of Limburgerhof (DE)

(73) Assignee: BASF Aktiengesellschaft, Ludwigsafen (DE)

(*) Notice: Subject to any disclaimer, the term of this patent is extended or adjusted under 35 U.S.C. 154(b) by 0 days.

(21) Appl. No.: 09/268,718

(22) Filed: Mar. 17, 1999

(30) Foreign Application Priority Data

Mar. 19, 1998 (DE) .............................. 198 11 934

(51) Int. Cl.[7] .................. C08F 210/08; C08F 210/14
(52) U.S. Cl. .................. 526/348.6; 526/348.5; 526/160; 526/943
(58) Field of Search .............. 526/348.6, 348.5, 526/901, 943, 160

(56) References Cited

U.S. PATENT DOCUMENTS

| 5,679,812 | 10/1997 | Winter et al. |
|---|---|---|
| 5,763,349 | 6/1998 | Zandona et al. |
| 5,852,143 | * 12/1998 | Sishta et al. .................. 526/127 |

FOREIGN PATENT DOCUMENTS

| 19606167 | 8/1997 | (DE) |
|---|---|---|
| 206 794 | 12/1986 | (EP) |
| 250 600 | 1/1988 | (EP) |
| 628 574 | 12/1994 | (EP) |
| 743324 | 11/1996 | (EP) |
| 87/03889 | 7/1987 | (WO) |
| 91/09882 | 7/1991 | (WO) |
| 93/09148 | 5/1993 | (WO) |
| 94/03506 | 2/1994 | (WO) |
| 94/26816 | 11/1994 | (WO) |
| 94/28034 | 12/1994 | (WO) |
| 95/04761 | 2/1995 | (WO) |
| 95/07939 | 3/1995 | (WO) |
| 95/14044 | 5/1995 | (WO) |
| 95/15815 | 6/1995 | (WO) |

OTHER PUBLICATIONS

Eng. Trans. of DE 196 06167.
Separation Tech. Them. Liq . . . Adv. Poly. Sci 98 1–47, 1991.
1992 Chem. Soc. Fall Meeting. vol. 67, 153–156.
J. Org. Chem, 369 (1989) 359–370, Wiesenfeldt et al.

* cited by examiner

*Primary Examiner*—David W. Wu
*Assistant Examiner*—R. Harlan
(74) *Attorney, Agent, or Firm*—Keil & Weinkauf

(57) ABSTRACT

An ethylene copolymer, composed of units of ethylene and at least one $C_3$–$C_{12}$ α-olefin, having a molecular weight distribution $M_w/M_n$ exceeding 3 and a distribution of comonomers which is characterized by a standard deviation σ of the average-weighted elution temperature $T_a$, determined by the method of the Temperature Rising Elution Fraction (TREF), which conforms to the following equation GI:

$$\sigma < k_4 - k_1(T_a - k_o) - k_2 k_3 (T_a - k_o)/(1 + k_3(T_a - k_o)) \ [^\circ C.] \quad GI$$

where $k_0$ is 338.5° C., $k_1$ is 0.053, $k_2$ is 1.1318° C., $k_3$ is 0.00483° C.$^{-1}$, $k_4$ is 0.55° C., and $T_a$ is <98° C.

12 Claims, No Drawings

ETHYLENE COPOLYMERS HAVING A NARROW DISTRIBUTION OF COMONOMERS

The present invention relates to ethylene copolymers, composed of units of ethylene and at least one $C_3$–$C_{12}$ α-olefin, having a molecular weight distribution $M_w/M_n$ exceeding 3 and a distribution of comonomers which is characterized by a standard deviation σ of the average-weighted elution temperature $T_a$, determined by the method of the Temperature Rising Elution Fraction (TREF), which conforms to the following equation GI:

$$\sigma < k_4 - k_1(T_a - k_o) - k_2 k_3(T_a - k_o)/(1 + k_3(T_a - k_o)) \; [° \text{C.}] \quad \text{GI}$$

where $k_0$ is 338.5° C., $k_1$ is 0.053, $k_2$ is 1.1318° C., $k_3$ is 0.00483° C.$^{-1}$, $k_4$ is 0.55° C., and $T_a$ is <98° C.

The invention further relates to a process for the preparation of such ethylene copolymers, to the use of the ethylene copolymers for the preparation of films, hollow bodies and fibers and also to films, hollow bodies and fibers prepared using these ethylene copolymers.

When effecting copolymerizations of ethylene with other α-olefins it is desirable to obtain a high degree of inclusion of these comonomers in the ethylene copolymer. The efficiency of the comonomer inclusion is particularly high when metallocene catalysts are used and can be controlled by regulating the ligand structure of these metal complexes when such catalysts are used.

It is generally assumed that the aperture angle between the cyclopentadienyl rings of the metallocene has a marked influence on the inclusion properties. A large aperture angle can be acquired eg by bridging the rings by an $SiMe_2$ or $C_2H_4$ bridge. Such metallocene catalysts are described, for example, in EP 336,128.

The industrially most significant polymerization processes for carrying out such copolymerizations are vapor-phase polymerization processes and suspension polymerization processes. In order to carry out such copolymerization processes it is necessary to apply the catalyst to a particulate support such as silica gel.

Methods of supporting metallocene catalysts are described, for example, in WO 95/07939, WO 87/03889, WO 94/28034, EP 206,794 and EP 250,600. In these cases MAO (methyl aluminoxane) or some other aluminoxane is used as co-catalyst. In addition, methods of supporting metallocenes in which boron compounds are used as activator have already been described (cf eg WO 91/09882 WO 94/03506 WO 95/14044 EP 628,574 WO 95/15815).

The polymers prepared using these supported catalysts mostly have a very narrow molecular weight distribution combined with very uniform comonomer inclusion, which results in some desirable properties such as good strength and brightness properties of the films made from these materials. However, due to the narrow molecular weight distribution, processing on machines conventionally used in the polymer industry is hampered to a very great extent. Polymers having a broader molecular weight distribution as may be obtained, for example, when using chromium or titanium catalysts can be processed much more easily, but suffer from the drawback that the comonomer (butene, hexene, octene) is unevenly distributed over the polymer molecule. Thus the concentration of comonomers in the low molecular weight portion is distinctly higher than in the high molecular weight portion. As a result, these easy-to-process polymers have unsatisfactory mechanical properties.

All known attempts to prepare copolymers having a wider distribution of molecular weights using metallocene catalysts, have led to unsatisfactory products. Thus EP-A 613,908, for example, describes the preparation of copolymers having a molecular weight distribution $M_w/M_n$ of up to 32, but these copolymers also have a broad distribution of comonomers.

WO 93/09148 also describes copolymers having a broader distribution of molecular weights, but this broadening of said molecular-weight distribution occurs at the expense of a broader distribution of comonomers and a high low-molecular content, which is reflected in a high hexane-extractable content of from 4.1 to 13.3%.

DE 19,606,167 describes supported catalyst systems with the aid of which polymers showing a narrow distribution of comonomers and a narrow distribution of molecular weights can be prepared. These catalyst systems contain metallocene complexes having bridged or unbridged metallocene ligands. This document makes no mention of copolymerizations or the products thereof.

It is thus an object of the present invention to provide ethylene copolymers comprising units of ethylene and at least one $C_3$–$C_{12}$ α-olefin having a molecular weight distribution of more than 3 while still exhibiting a narrow distribution of comonomers.

Accordingly, we have found the ethylene copolymers defined above. We have also found a process for the preparation of such copolymers, the use of these copolymers for the preparation of films, hollow bodies and fibers and also films, hollow bodies and fibers which have been manufactured from these copolymers.

The narrow distribution of comonomers in the copolymers of the invention can be advantageously described in terms of the standard deviation of the average-weighted elution temperature $T_a$, such as can be determine by the TREF method. The TREF method is described, for example in Wild, Advances in Polymer Science, 98, pp 1 to 47, 1990, Springer-Verlag and Wild, Blatz, Polymer Mater. Sci. Eng. 67 pp 153, 1992. The average-weighted elution temperature ($T_a$) and the standard deviation (σ) are used in the following manner (cf Bevington, McGraw-Hill, Data Reduction and Error Analysis for the Physical Sciences, 1969):

$$T_a = \Sigma(c(T_i)^* T_i)/\Sigma c(T_i) [° \text{C.}]$$

$$\sigma = ([\Sigma(T_i t_a)^{2*} c(T_i)]/\Sigma c(T_i))^{1/2} [° \text{C.}]$$

Here $T_i$ denotes the temperature at point i and $c(T_i)$ the polymer concentration at the temperature $T_i$.

The copolymers of the invention now have an unusually small standard deviation σ, which can be defined by equation GI using the above values for $k_0$, $k_1$, $k_3$, and $k_4$.

Particularly preferred are copolymers in which the standard deviation σ is sufficiently small to conform to equation I, where $k_0$ is 496.6° C., $k_1$ is 0.0467, $k_2$ is 1.1318° C., $k_3$ is 0.00483° C.$^{-1}$, $k_4$ is 0.55° C. and $T_a$ is <98° C.

The advantageous properties of the copolymers of the invention result substantially from the combination of this narrow distribution of comonomers with a relatively broad molecular weight distribution. This molecular weight distribution $M_w/M_n$ must have a value above 3, preferably a value greater than 3 and less than 8 and more preferably a value between 3.5 and 7.0.

The copolymers of the invention contain not only units of ethylene but also units of at least one $C_3$–$C_{12}$ α-olefin. Suitable α-olefins are propene, butene, pentene, hexene, heptene, octene, nonene, decene, undecene and dodecene. Comonomer units derived from butene and hexene are preferred.

The amount of the comonomers in the copolymer is governed by the required mass density of the copolymer. The copolymers of the invention usually have a comonomer content which gives a mass density of from 0.87 to 0.96 g/cm$^3$, preferably from 0.90 to 0.94 g/cm$^3$, and more preferably from 0.910 to 0.935 g/cm$^3$.

The copolymers of the invention can exhibit a wide range of molecular weights, where adjustment of the molecular weight to a desired value can be effected by methods familiar to the person skilled in the art, that is to say, for example, by altering the polymerization temperature or using reagents such as hydrogen. The copolymers usually have a molecular weight $M_w$ exceeding 100,000, preferably exceeding 150,000.

Moreover, copolymers having a small content of low-molecular polymer chains are preferred. This portion, which may be characterized by the heptane-extractable content, has a negative influence on the sensory examination of the copolymers, for example. The heptane-extractable content of the copolymers of the invention is preferably less than 4 wt %, more preferably less than 1 wt % and most preferably less than 0.1 wt %, based on the total weight of the copolymer.

Copolymers exhibiting the set of properties provided by the invention can be prepared in various ways. One advantageous example of such preparation is a process characterized in that copolymerization is effected using a supported catalyst system which can be obtained by A) the reaction of an inorganic support material with a metal compound of the general formula I:

$$M^1(R^1)_r(R^2)_s(R^3)_t(R^4)_u \qquad \text{I}$$

in which $M^1$ denotes an alkali metal, an alkaline earth metal or a Group IIIA or Group IVA metal, $R^1$ denotes hydrogen, $C_1$–$C_{10}$ alkyl, $C_6$–$C_{15}$ aryl, alkylaryl or arylalkyl containing from 1 to 10 carbon atoms in the alkyl radicals and from 6 to 20 carbon atoms in the aryl radicals, $R^2$ to $R^4$ denote hydrogen, halogen, $C_1$–$C_{10}$ alkyl, $C_6$–$C_{15}$ aryl, alkylaryl, arylalkyl, alkoxy or dialkylamino containing from 1 to 10 carbon atoms in the alkyl radicals and from 6 to 20 carbon atoms in the aryl radicals, r is an integer from 1 to 4 and s, t and u are integers from 0 to 3, where the sum of r, s, t, and u is equal to the valence of $M^1$, B) the reaction of the material obtained under A) with a bridged metallocene complex in its metal dihalide form and a metallocenium ion-forming compound followed by C) reaction with a metal compound of the general formula II:

$$M^2(R^5)_o(R^6)_p(R^7)_q \qquad \text{II}$$

in which $M^2$ denotes an alkali metal, an alkaline earth metal, zinc or a Group IIIA metal, $R^5$ denotes hydrogen, $C_1$–$C_{10}$ alkyl, $C_6$–$C_{15}$ aryl, alkylaryl or arylalkyl containing from 1 to 10 carbon atoms in the alkyl radicals and from 6 to 20 carbon atoms in the aryl radicals, $R^6$ and $R^7$ denote hydrogen, halogen, $C_1$–$C_{10}$ alkyl, $C_6$–$C_{15}$ aryl, alkylaryl, arylalkyl or alkoxy containing from 1 to 10 carbon atoms in the alkyl radicals and from 6 to 20 carbon atoms in the aryl radicals, o is an integer from 1 to 3 and p and q are integers from 0 to 2, where the sum of o, p and q is equal to the valence of $M^2$.

The support materials used are preferably finely divided solids whose particle diameters range from 1 to 200 μm and particularly from 30 to 70 μm.

Suitable support materials are for example silica gels, preferably those of the formula $SiO_2 * a\ Al_2O_3$, in which a stands for a number ranging from 0 to 2, preferably from 0 to 0.5; ie alumino-silicates or silicon dioxide. Such products are commercially available, for example as Silica Gel 332 sold by Grace or ES 70x sold by Crosfield.

To remove the adsorbed water, these support materials can be subjected to a heat treatment or are calcined, if desired, said treatment preferably being carried out at from 80° to 200° C. and more preferably at from 1000 to 150° C.

Other inorganics such as $Al_2O_3$ or $MgCl_2$ or mixtures containing such compounds can likewise be used as support materials.

Of the metal compounds of the general formula I those are preferred in which $M^1$ stands for a Group IIIA metal, particularly for aluminum, $R^1$ stands for $C_1$–$C_{10}$ alkyl and $R^2$ to $R^4$ stand for $C_1$–$C_{10}$ alkyl. If, as is particularly preferred, $M^1$ stands for aluminum, then u is zero and the radicals $R^1$ to $R^3$ are, preferably, identical and preferably denote methyl, ethyl, isobutyl or hexyl, more preferably isobutyl.

The metal compound of the general formula I is preferably added as a solution to a suspension of the support. Particularly suitable solvents or suspending agents are hydrocarbons such as heptane. The amount of metal compound I can vary within wide limits, the minimum amount being governed by the number of the hydroxyl groups in the support. The temperatures, reaction times and pressures are not crucial, temperatures of from 0° to 80° C. and reaction times of from 0.1 to 48 hours being preferred.

Following pretreatment of the support, it has been found to be advantageous to remove excess metal compound I by elutriation using, for example, a hydrocarbon such as pentane or hexane and then to dry the support.

The material thus prepared is storable for a period of at least 6 months and is not pyrophoric.

This material is now caused to react with a metallocene complex in its metal dihalide form and a metallocenium ion-forming compound in the next stage B).

Alternatively, pretreatment of the support and subsequent application of active material may be carried out in a single step. In this case the pretreated support is not isolated, but instead the suspension obtained is caused to react directly with a metallocene dihalide and a metallocenium ion-forming compound.

Examples of suitable metallocene complexes are the following compounds of the general formula III:

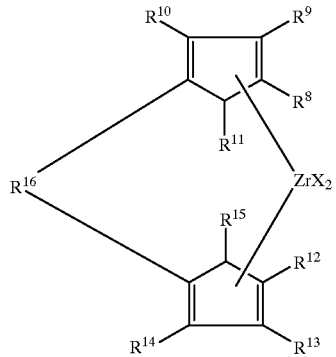

in which

X stands for clorine, $R^8$ to $R^{15}$ stand for hydrogen or $C_1$ to $C_4$ alkyl or two adjacent radicals $R^8$ to $R^{15}$ together form a cyclic group having from 4 to 12 carbon atoms, $R^{16}$ stands for

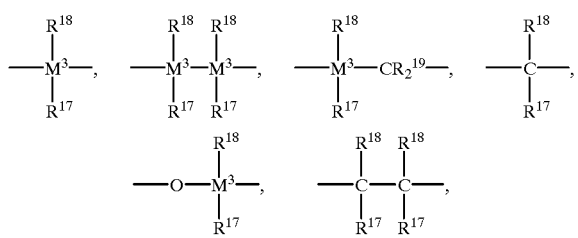

$=BR^{18}$, $=AlR^{18}$, —Ge—, —Sn—, —O—, —S—, $=SO$, $=SO_2$, $=NR^{18}$, $=CO$, $=PR^{18}$ or $=P(O)R^{18}$, and $R^{17}$, $R^{18}$ and $R^{19}$ are the same or different and denote hydrogen, halogen, $C_1$–$C_{10}$ alkyl, $C_1$–$C_{10}$ fluoroalkyl, $C_6$–$C_{10}$ fluoroaryl, $C_6$–$C_{10}$ aryl, $C_1$–$C_{10}$ alkoxy, $C_2$–$C_{10}$ alkenyl, $C_7$–$C_{40}$ arylalkyl, $C_8$–$C_{40}$ arylalkenyl or $C_7$–$C_{40}$ alkylaryl, 10 or two adjacent radicals form a ring together with the atom by which they are linked, and $M^3$ is silicon, germanium or tin.

Those of the metallocene complexes of general formula III are preferred in which the bridged cyclopentadienyl ligands are derived from the indenyl, tetahydroindenyl or benzindenyl ring systems. Furthermore, such compounds III are preferred in which the substituted or unsubstituted cyclopentadienyl ligands are bridged by ethylene groups or substituted ethylene groups or by dimethylsilyl groups.

Examples of particularly suitable coordination compounds are inter alia dimethylsilanediyl-bis(cyclopentadienyl)zirconium dichloride, dimethylsilanediyl-bis(indenyl)zirconium dichloride, dimethylsilanediyl-bis(tetrahydroindenyl)zirconium dichloride, ethylene-bis(cyclopentadienyl)zirconium dichloride, ethylene-bis(indenyl)zirconium dichloride, ethylene-bis(tetrahydroindenyl)zirconium dichloride, tetramethylethylene-9-fluorenylcyclopentadienylzirconium dichloride, dimethylsilanediyl-bis(3-t-butyl-5-methylcyclopentadienyl)zirconium dichloride, dimethylsilanediyl-bis(3-t-butyl-5-ethylcyclopentadienyl)zirconium dichloride, dimethylsilanediylbis(2-methylindenyl)zirconium dichloride, dimethylsilanediyl-bis(2-isopropylindenyl)zirconium dichloride, dimethylsilanediyl-bis(2-t-butylindenyl)zirconium dichloride, diethylsilanediyl-bis(2-methylindenyl)zirconium dibromide, dimethylsilanediyl-bis(3-methyl-5-methylcyclopentadienyl)zirconium dichloride, dimethylsilanediyl-bis(3-ethyl-5-isopropylcyclopentadienyl)zirconium dichloride, dimethylsilanediylbis(2-methylindenyl)zirconium dichloride, dimethylsilanediyl-bis(2-methylbenzindenyl)zirconium dichloride and dimethylsilanediyl-bis(2-methylindenyl)hafnium dichloride.

Such coordination compounds can be synthesized by known methods, of which the reaction of appropriately substituted cyclic hydrocarbon anions with halides of zirconium is preferred.

Examples of appropriate manufacturing processes are described in, inter alia, the Journal of Organometallic Chemistry, 369, (1989), 359–370.

Alternatively, mixtures of different metallocene complexes may be used.

Suitable metallocenium ion-forming compounds are, in particular, strong neutral Lewis acids, ionic compounds having Lewis acid cations and ionic compounds having Bronstedt acid cations.

The preferred strong neutral Lewis acids are compounds of the general formula IV $$M^4 X^1 X^2 X^3 \qquad \qquad IV,$$

in which
$M^4$ denotes a Group IIIA element, in particular B, Al or Ga, preferably B,
$X^1$, $X^2$ and $X^3$ stand for hydrogen, $C_1$–$C_{10}$ alkyl, $C_6$–$C_{15}$ aryl, alkyl-aryl, arylalkyl, haloalkyl or haloaryl containing from 1 to 10 carbon atoms in the alkyl groups and from 6 to 20 carbon atoms in the aryl groups, or for fluorine, chlorine, bromine or iodine, in particular for haloaryls and preferably for pentafluorophenyl.

Particularly preferred are compounds of general formula IV in which $X^1$, $X^2$ and $X^3$ are identical and preferably denote tris(pentafluorophenyl)borane.

Suitable ionic compounds having Lewis acid cations are compounds of the general formula V:

$$[(Y^{a+})Q_1 Q_2 \ldots Q_z]^{d+} \qquad \qquad V,$$

in which
Y denotes a Group IA to Group VIA element or a Group IB to Group VIIIB element,
$Q_1$ to $Q_z$ stand for uninegatively charged radicals such as $C_1$–$C_{28}$ alkyl; $C_6$–$C_{15}$ aryl; alkylaryl, arylalkyl, haloalkyl or haloaryl containing from 6 to 20 carbon atoms in the aryl groups and from 1 to 28 carbon atoms in the alkyl groups; $C_1$–$C_{10}$ cycloalkyl optionally substituted by $C_1$–$C_{10}$ alkyl; halogen; $C_1$–$C_{28}$ alkoxy; $C_6$–$C_{15}$ aryloxy; silyl; or mercaptyl,
a is an integer from 1 to 6,
z is an integer from 0 to 5 and
d is (a minus z) and must be greater than or equal to 1.

Carbonium cations, oxonium cations and sulfonium cations and also cationic transition-metal complexes are particularly suitable. The triphenylmethyl cation, the silver cation and the 1,1-dimethylferrocenyl cation are particularly noteworthy examples. They preferably possess non-coordinative counter-ions, particularly boron compounds, as specified, for example, in WO 91/09882, preferably tetrakis (pentafluorophenyl) borate.

Ionic compounds having Bronstedt acid cations and again preferably non-coordinative counter-ions are specified in WO 91/09882, the preferred cation being N,N-dimethylanilinium.

The amount of metallocenium ion-forming compounds is preferably from 0.1 to 10 equivalents, based on the metallocene complex III.

The conditions used for the reaction of the metallocene complex with the metallocenium ion-forming compound are not crucial, it being preferable to operate in solution, suitable solvents being particularly hydrocarbons, preferably aromatics such as toluene.

To this there is now added the material prepared under A). A concentration of metallocene complex of from 0.1 to 10 wt %, based on the inorganic support material, is particularly suitable. The conditions used for this conversion are again not crucial and temperatures ranging from 20° to 100° C. and reaction times ranging from 0.1 to 20 hours have been found to be particularly suitable.

The material obtained under B) can now be isolated and can be stored for a period of at least 6 months.

In a further stage C), the activating stage, the material obtained under B) is caused to react with a metal compound of the general formula II. This activation can take place at any time, ie before, during or after metering of the material obtained under B) to the reactor. Activation preferably takes place following metering of the material obtained under B) to the reactor.

Those of the metal compounds of the general formula II are preferred in which
$M^2$ denotes lithium, magnesium or aluminum and
$R^5$ to $R^7$ stand for $C_1$–$C_{10}$ alkyl.

The conditions used for the reaction taking place in stage C) are not crucial. Temperatures, reaction times and pressures depend on the time at which conversion, ie activation, takes place.

The copolymerization process of the invention can be carried out in suspension or in the vapor phase, vapor-phase polymerization being preferred.

The copolymers of the invention are, by reason of their mechanical properties and good processibility, highly suitable for the preparation of films. Thus most of these copolymers can be processed to films and to hollow bodies and fibers on conventional equipment such as is employed for polymers prepared by Ziegler or Phillips catalysis or by free-radical high-pressure polymerization. The films have excellent strength properties and very good optical properties.

EXAMPLES

The TREF tests were carried out under the following experimental conditions:
    solvent: 1,2,4-trichlorobenzene; flux: 1 mL/min; heating rate: 1° C./min; amount of polymer: 5–10 mg; support: diatomaceous earth.

The molecular weights of the copolymers were determined by GPC-tests under the following conditions, following DIN 55,672:
    solvent: 1,2,4-trichlorobenzene; flux: 1 mL/min; temperature: 140° C.; calibration: against polyethylene standards.

Preparation of the Supported Metallocene Catalysts

In a flask having a capacity of 250 mL and equipped with a magnetic stirrer there were placed 100 mL of absolute toluene. To this there were added 400 mg (0.5 mmol) of N,N-dimethylanilinium-tetrakis(pentafluorophenyl) borate, 0.5 mmol of metallocene dichloride and 10 g of silica gel (ES 70X sold by Crosfield) which had been deactivated with triisobutylaluminum. The resulting mixture was heated to 80° C. for a period of 1 h. The solvent was subsequently removed in vacuo. Yield: 11 g of supported catalyst.

Metallocenes used

1: dimethylsilyl-bis(indenyl)zirconium dichloride
2: dimethylsilyl-bis(tetrahydroindenyl)zirconium dichloride
3: 1,2-ethylene-bis(tetrahydroindenyl)zirconium dichloride
4: 1,2-ethylene-bis(indenyl)zirconium dichloride Ethylene/Butene Copolymerizations In a stirred steel autoclave having a capacity of 10 L there were placed 4.5 L of isobutane, 400 mL of butene-1 and 300 mg of butyloctyl magnesium (as a 0.3M solution in heptane) following careful purging with nitrogen and thermostatting at the polymerization temperature of 70° C. The supported catalyst was then swept in with a further 0.5 L of isobutane, and ethylene was forced in so as to establish an overall pressure of 38 bar. The pressure in the autoclave was kept constant by replenishing with ethylene. Following a period of 90 min, polymerization was stopped by depressurizing the autoclave. The polymer was obtained in the form of a free-flowing coarse powder.

The polymerization data and the properties of the copolymers obtained are listed in Table 1.

TABLE 1

Ethylene/butene copolymerizations

| Ex. | Catalyst | Supported catalyst (mg) | Productivity (g/g) | Density (g/cm$^3$) | Butene (wt %) | Mol. wt. ($M_w \times 10^3$) | $M_w/M_n$ | Cold heptane extract (wt %) |
|---|---|---|---|---|---|---|---|---|
| 1 | K1 | 85  | 32000 | 0.9136 | 6.9 | 265 | 6.3 | 0.03 |
| 2 | K2 | 243 | 6800  | 0.9132 | 4.5 | 529 | 3.8 | 0.02 |
| 3 | K3 | 97  | 31000 | 0.9145 | 4.0 | 805 | 3.8 | 0.01 |
| 4 | K4 | 115 | 7800  | 0.9217 | 4.9 | 201 | 4.8 | 0.01 |

Ethylene/Hexene Copolymerizations

In a stirred steel autoclave having a capacity of 10 L there were placed 4.5 L of isobutane, 400 mL of 1-hexene and 300 mg of butyloctyl magnesium (as 0.3M solution in heptane) following careful purging with nitrogen and thermostatting at the polymerization temperature of 70° C. The supported catalyst was then swept in with a further 0.5 L of isobutane, and ethylene was forced in so as to establish an overall pressure of 38 bar. The pressure in the autoclave was kept constant by replenishing with ethylene. Following a period of 90 min, polymerization was stopped by depressurizing the autoclave. The polymer was obtained in the form of a free-flowing coarse powder.

The exact polymerization data and the properties of the resulting copolymers are listed in Table 2.

TABLE 2

Ethylene/hexene copolymerizations

| Ex. | Catalyst | Supported catalyst (mg) | Productivity (g/g) | Density (g/cm³) | Butene (wt %) | Mol. wt. ($M_w \times 10^3$) | $M_w/M_n$ | Cold heptane extract (wt %) |
|---|---|---|---|---|---|---|---|---|
| 5 | K1 | 130 | 17700 | 0.9174 | 5.8 | 178 | 5.8 | 0.04 |
| 6 | K2 | 135 | 4300 | 0.9157 | 3.6 | 404 | 5.4 | 0.01 |
| 7 | K3 | 118 | 24000 | 0.9160 | 2.7 | 479 | 4.5 | 0.01 |
| 8 | K4 | 135 | 6300 | 0.0278 | 3.1 | 183 | 5.1 | 0.01 |

Samples of polymers obtained in Examples 7 and 8 were subjected to TREF analysis.

The following readings were obtained:
Example 7: σ=4.12° C., $T_a$=90.78° C.;
Example 8: σ=3.92° C., $T_a$=89.01° C.

We claim:

1. An ethylene copolymer, composed of units of ethylene and at least one $C_3$–$C_{12}$ α-olefin, having a heptane-extractable content of less than 0.1 wt %, based on the total weight of the copolymer, a molecular weight distribution $M_w/M_n$ exceeding 3 and a distribution of comonomers which is characterized by a standard deviation σ of the average-weighted elution temperature $T_a$, determined by the method of the Temperature Rising Elution Fraction (TREF), which conforms to the following equation GI:

$$\sigma < k_4 - k_1(T_a - k_o) - k_2 k_3(T_a - k_o)/(1 + k_3(T_a - k_o)) \text{ (° C.)} \quad \text{GI}$$

where $k_0$ is 338.5° C., $k_1$ is 0.053, $k_2$ is 1.1318° C., $k_3$ is 0.00483° C.$^{-1}$, $k_4$ is 0.55° C., and $T_a$ is <98° C.

2. An ethylene copolymer as defined in claim 1 having a comonomer distribution which is characterized by a standard deviation σ of the average-weighted elution temperature $T_a$ which conforms to equation GI where $k_0$ is 496.6° C., $k_1$ is 0.0467, $k_2$ is 1.1318° C., $k_3$ is 0.00483° C.$^{-1}$, $k_4$ is 0.55° C., and $T_a$ is <98° C.

3. An ethylene copolymer as defined in claim 1, which has a molecular weight distribution $M_w/M_n$ greater than 3 and less than 8.

4. An ethylene copolymer as defined in claim 1, which has a molecular weight distribution $M_w/M_n$ between 3.5 and 7.0.

5. An ethylene copolymer as defined in claim 1, which has a molecular weight $M_w$ exceeding 150,000.

6. An ethylene copolymer as defined in claim 1, wherein the $C_3$–$C_{12}$ α-olefin units present therein are butene units.

7. An ethylene copolymer as defined in claim 1, wherein the $C_3$–$C_{12}$ α-olefin units present therein are hexene units.

8. A process for the preparation of an ethylene copolymer as defined in claim 1, wherein copolymerization is effected using a supported catalyst system which can be obtained by A) the reaction of an inorganic support material with a metal compound of the general formula I:

$$M^1(R^1)_r(R^2)_s(R^3)_t(R^4)_u \quad \text{I}$$

in which $M^1$ denotes an alkali metal, an alkaline earth metal or a Group IIIA or Group IVA metal, $R^1$ denotes hydrogen, $C_1$–$C_{10}$ alkyl, $C_6$–$C_{15}$ aryl, alkylaryl or arylalkyl containing from 1 to 10 carbon atoms in the alkyl radicals and from 6 to 20 carbon atoms in the aryl radicals, $R^2$ to $R^4$ denote hydrogen, halogen, $C_1$–$C_{10}$ alkyl, $C_6$–$C_{15}$ aryl, alkylaryl, arylalkyl, alkoxy or dialkylamino containing from 1 to 10 carbon atoms in the alkyl radicals and from 6 to 20 carbon atoms in the aryl radicals, r is an integer from 1 to 4 and s, t and u are integers from 0 to 3, where the sum of r, s, t, and u is equal to the valence of $M^1$, B) the reaction of the material obtained under A) with a bridged metallocene complex in its metal dihalide form and a metallocenium ion-forming compound followed by C) reaction with a metal compound of the general formula II:

$$M^2(R^5)_o(R^6)_p(R^7)_q \quad \text{II}$$

in which $M^2$ denotes an alkali metal, an alkaline earth metal, zinc or a Group IIIA metal, $R^5$ denotes hydrogen, $C_1$–$C_{10}$ alkyl, $C_6$–$C_{15}$ aryl, alkylaryl or arylalkyl containing from 1 to 10 carbon atoms in the alkyl radicals and from 6 to 20 carbon atoms in the aryl radicals, $R^6$ and $R^7$ denote hydrogen, halogen, $C_1$–$C_{10}$ alkyl, $C_6$–$C_{15}$ aryl, alkylaryl, arylalkyl or alkoxy containing from 1 to 10 carbon atoms in the alkyl radicals and from 6 to 20 carbon atoms in the aryl radicals, o is an integer from 1 to 3 and p and q are integers from 0 to 2, where the sum of o, p and q is equal to the valence of $M^2$.

9. A process for the preparation of an ethylene copolymer as defined in claim 8, wherein polymerization is carried out in the vapor-phase.

10. A process for the preparation of an ethylene copolymer as defined in claim 8, wherein polymerization is carried out in suspension.

11. A method of using a copolymer as defined in claim 1 for the preparation of a film, hollow body or fiber.

12. A film, hollow body or fiber whenever prepared from a copolymer as defined in claim 1.

* * * * *

UNITED STATES PATENT AND TRADEMARK OFFICE
CERTIFICATE OF CORRECTION

PATENT NO. : 6,271,329 B1
DATED : August 7, 2001
INVENTOR(S) : Kristen et al.

It is certified that error appears in the above-identified patent and that said Letters Patent is hereby corrected as shown below:

<u>Column 10, claim 8,</u>
Line 33, the formula "$M^2(R^5)_o(R^b)_p(R^7)_q$" should read -- $M^2(R^5)_o(R^6)_p(R^7)_q$ --.

Signed and Sealed this

Twenty-ninth Day of January, 2002

Attest:

JAMES E. ROGAN
*Attesting Officer*  *Director of the United States Patent and Trademark Office*